United States Patent [19]

Relson

[11] Patent Number: 4,623,569

[45] Date of Patent: Nov. 18, 1986

[54] APPLYING REGISTER MARKS TO ARTICLES

[75] Inventor: Morris Relson, Great Neck, N.Y.

[73] Assignee: Esselte Pendaflex Corporation, Graden City, N.Y.

[21] Appl. No.: 679,747

[22] Filed: Dec. 10, 1984

[30] Foreign Application Priority Data

Dec. 8, 1983 [GB] United Kingdom ................. 8332782

[51] Int. Cl.[4] ............................. B32B 7/06; C09J 7/02

[52] U.S. Cl. ....................................... 428/42; 428/200; 428/202; 428/207; 428/343; 428/352; 428/354; 428/914

[58] Field of Search ................... 428/40, 42, 343, 352, 428/200, 207, 202, 354, 914

[56] References Cited

U.S. PATENT DOCUMENTS 4,015,034 3/1977 Smolen ................................. 428/40

*Primary Examiner*—Thomas J. Herbert

*Attorney, Agent, or Firm*—Darby & Darby

[57] ABSTRACT

Register marking units consist of a base carrier, usually in strip form, having successive ink areas printed on it which are printed in a shearable ink and which are in turn overprinted by a suitable pattern, the pattern being printed in adhesive. The pattern may be adhered to an upper transparent sheet and the ink area to a lower sheet e.g. by adhering the base carrier thereto via a layer of pressure sensitive adhesive on the side of the base carrier remote from the ink areas and normally protected by a release paper.

The upper and lower sheets may act to sandwich the unit, to leave the adhesive pattern adhered to the upper sheet when the upper and lower sheets are separated. Thereafter said upper and lower sheets may be re-aligned by registering the adhesive pattern with the holes in the ink area from which ink was removed by the adhesive when upper and lower sheets were separated.

5 Claims, 1 Drawing Figure

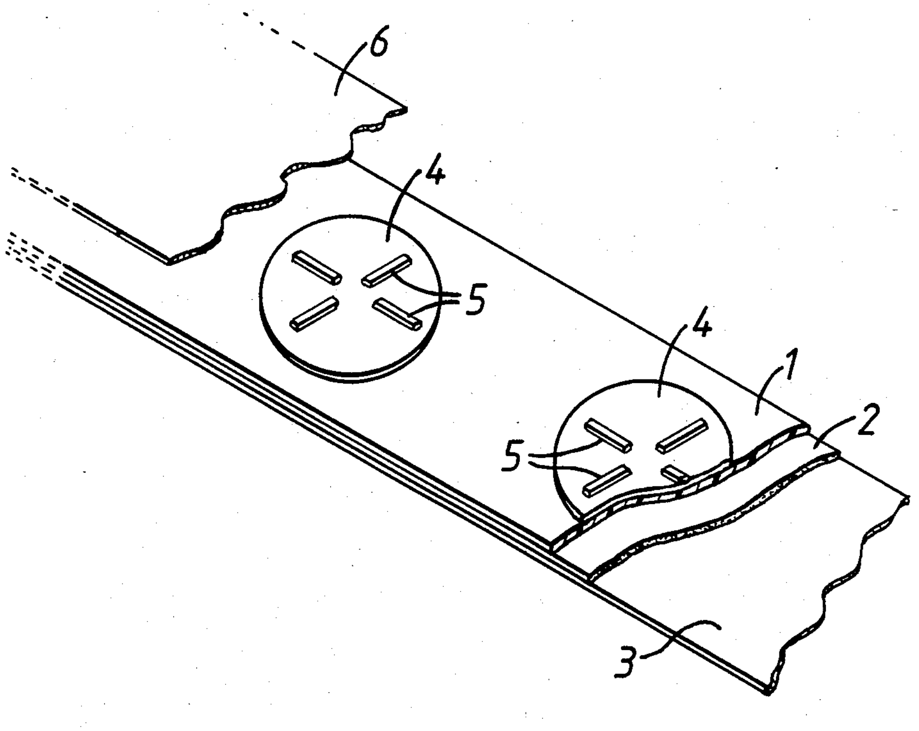
6
4
5
4
1
2
5
3

APPLYING REGISTER MARKS TO ARTICLES

This invention relates to applying register marks to articles.

BACKGROUND OF THE INVENTION

In many fields of draughtsmanship and artistry it is often desirable to be able to reassemble two or more sheets in register with one another following the original preparation of one or more of them respectively in register. Thus, for example, in many three-colour processes, so-called three-colour separations are made through different filters and it is required to assemble these in register to see the final image.

With a view to facilitating such activity, various proposals have been made in the past. By way of example attention is directed to U.S. Pat. No. 4,015,034 which discloses an article for applying register or index markers to superimposed sheets or layers in precise registration. When used the article leaves a particular printed configuration on one sheet and a negative thereof on the other. U.S. Pat. No. 4,015,034 discloses a complex multi-layer system for achieving this.

It has now been found that it is possible to produce articles functioning in similar fashion but with much simpler construction requiring only two printing steps which need not be in accurate register one with the other.

GENERAL DESCRIPTION OF THE INVENTION

Thus, in accordance with a first feature of the present invention there is provided a register marking unit consisting of a thin base carrier having successively printed thereon first an area of shearable opaque ink removable from the carrier base under the pulling power of an adhesive and second a design or mark lying wholly or substantially within the ink area and printed in an adhesive.

Such a device is used in the following way: the base carrier is first adhered to one of the inner faces of a pair of sheets it is desired to separate and subsequently realign in the same position. The two sheets are then pressed together whereupon adhesive adheres to the other of the two inwardly facing sheet surfaces. On peeling the sheets apart, the adhesive pulls with it the opaque ink corresponding to the adhesive mark thus leaving a negative of the adhesive mark on the base carrier which is in turn adhered on the other sheet. The two sheets can accordingly now be re-assembled together merely by fitting the normally black adhesive plus ink image into the normally white precisely matching space. For ease of operation, two or three register marks may be used at spaced locations on a pair of sheets.

Preferably in order to assist the adhesion of the carrier base to one of the sheets it is desired to maintain in register, the side of the base carrier opposite the ink printed side is provided with a thin coating of a tacky pressure-sensitive adhesive protected until required for use by a release paper or release film which may be peeled off to expose the adhesive when it is desired to use the product.

Preferably the first (i.e. ink) area is printed in a shearable black ink and the adhesive used printed over it is a substantially non-tacky adhesive which can nevertheless be adequately adhered to a sheet material under the action of high pressure, for example generated by rubbing over or burnishing with a stylus.

The device of the present invention may be used either way up. For example, if it is desired to maintain two sheets in accurate register, the carrier may be adhered to the upper surface of the under sheet and the top sheet then rubbed or burnished thereover whereon the printed adhesive adheres to the underside of the upper sheet. Alternatively, the base carrier may be adhered to the underside of the upper sheet and after the two sheets have been assembled together and pressure applied, the adhesive image is located on the top surface of the lower sheet.

The device of the invention is conveniently produced in strip or tape form, having a succession of identical ink and adhesive areas printed on the carrier tape on the other side of which a coating of pressure sensitive adhesive may be provided in order to attach a section of the tape quickly to any sheet it is desired to register with another sheet. The permanently tacky pressure sensitive adhesive may be protected by the adherence thereto of a release paper strip in customary fashion. It is also desirable to locate a protective release paper strip adjacent the exposed adhesive images, e.g. by rolling up a tape product with an interleaving strip of release paper. If the release paper used to protect the permanently tacky adhesive has an adequate release surface on the side remote from that permanently tacky adhesive, it may fulfil both functions.

DESCRIPTION OF PREFERRED EMBODIMENT

The invention is illustrated by way of example in the accompanying drawing which shows in enlarged diagrammatic perspective view a section of a strip according to the present invention, partly broken away.

Referring to the drawing, the device consists of a central film strip 1, e.g. made of polyethylene terephthalate film, one side of which bears a coating 2 of permanently tacky pressure sensitive adhesive. This protected until it is desired to stick a section of carrier film 1 down by a strip of release paper 3 temporarily adhered thereto.

Printed successively along strip 1 are circular images in a shearable black printing ink 4, each of which bears four bars 5 printed thereon in a substantially non-tacky adhesive. Loosely held over adhesive bars 5 is a strip of release paper 6, which in some cases may be dispensed with when the strip is coiled up.

The following example will serve to illustrate the invention:

EXAMPLE

Polyethylene terephthalate strips, 0.075 mm thick were coated on one side with an adhesive composition consisting of (parts by weight):

Vinyl acrylic thermoplastic copolymer (DUROTAK 180-2404 ex National Adhesive plc): 40 parts Ethyl acetate: 30 parts Toluene: 30 parts Coating was effected by a wire-wound applicator bar, and the strips then dried in an air oven at 70°–80° C. for 10 minutes to give a permanently tacky adhesive coating of coating weight about 7 g/m$^2$. This was protected from contamination by adhering thereto a strip of release paper of polyethylene coated kraft, silicone coated one side (Quiklease 30/102 ex Jointine Products Co. Ltd.)

A black printing ink was formulated from the following ingredients in the following proportions by weight:

Alcohol/alkali soluble maleic condensate resin (softening point 171° C. acid No. 194, type Pentalyn 255 ex Hercules plc): 114 parts Butyl oxitol: 167 parts Wax (Dehysol, ex Degussa Ltd.): 9 parts Carbon black (Printex 2/0 ex Degussa Ltd.): 9 parts Ethyl hydroxy ethyl cellulose (extra low viscosity grade ex Hercules plc): 34 parts The ink was milled to Hegman gauge reading better than 7 and the viscosity of the ink then adjusted using butyl oxitol to give an ink which could be easily screen printed.

Discs such as 4 (FIG. 1) were printed on the polyethylene terephthalate strips of diameter 10 mm and the strips dried in an oven at 70° to 80° C. for 10 minutes to give a dry coating caliper of $6\times10^{-3}$ mm.

An adhesive was made up of the following ingredients in the following parts by weight:

Polyethylene wax (softening point 106° C., hardness 3.5, ACP.6 ex Allied Chemical): 4.8 parts Hydrocarbon solvent (dearomatised, type Exsol 145/160 ex Esso, boiling range 144° to 156° C.): 7.6 parts Polyisobutylene (VAMW 380,000, type Oppanol B50, ex BASF): 1.6 parts Polyisobutene (NAMW 1300, bromine No. 12, type Hyvis 30 ex B.P. plc): 3.0 parts Fumed hydrophobic silica (BET surface area 120 $m^2/g$, type Aerosil R972 ex Degussa GmbH): 4.0 parts Bars 5 were printed on the black ink discs 4 by screen printing this adhesive. The bars were then dried in an air oven at 70° to 80° C. for 5 minutes.

The adhesive printed images were protected by overlaying with a siliconised vegetable parchment.

The materials so made could be used by cutting a section containing a register mark from the strip, peeling off the release paper 3 and attaching the mark to one surface of a pair of sheets to be registered with one another. The sheets would be then placed together in proper position and the area of the black ink burnished over, using a suitable stylus. On peeling the two sheets apart the adhesive image formed by bars 5 and the ink from disc 4 underlying the bar transfer to the other sheet while the remainder of ink image 4 remains on the first sheet, with ink removed from where the bars 5 had been. The two sheets could then be re-aligned accurately as and when desired, by matching the set of bars with the spaces where the bars had initially been on the other sheet.

It will be understood that the adhesive forming the image 5 is pressure activatable, so as to adhere to its associated sheet to be registered, upon appropriate burnishing. It is not essential that image 5 be entirely or even substantially non-tacky, so long as its adhesion to the ink 4, after pressure activation, is sufficient to shear the ink 4, and to overcome the adhesion of the overprinted portions of ink 4 to carrier 1 without lifting the entire ink layer 4 upon separation of the sheets to be registered. The burnishing used will assist in shearing the ink 4 around the design formed by bars 5, and facilitate the separation of the adhesive image 5 from the remainder of the ink 4.

Other compositions satisfying the requirements stated above may, of course, be used in practicing the invention, which is defined and limited solely by the appended claims.

I claim:

1. A register marking unit consisting essentially of a thin base carrier sheet having successively printed thereon first, an area of shearable opaque ink removable from the carrier base sheet under the pulling power of an adhesive and second, a design lying wholly or substantially within the ink area and printed in an adhesive.

2. The register marking unit of claim 1 wherein the side of the base carrier sheet opposite the ink printed side is provided with a thin coating of a tacky pressure sensitive adhesive.

3. The register marking unit of claim 1 wherein the areas of shearable opaque ink are areas of shearable black ink and the adhesive printed thereover is a substantially non-tacky adhesive which can be adhered to a receptor sheet under the action of high pressure.

4. The register marking unit of claim 1 in the form of a strip or tape having a succession of separate ink and adhesive areas printed along it.

5. A register marking unit consisting essentially of a thin base carrier sheet, a first layer thereon of a shearable opaque ink in a predetermined area of said carrier base sheet and removable from the carrier base sheet under the pulling power of an adhesive, a second layer on said first layer, lying substantially within the ink area and formed of a substantially non-tacky adhesive adherable to a receptor sheet under the action of high pressure, and a third layer on said base carrier sheet on the side opposite the side of said ink layer, said third layer being constituted by a thin coating of a tacky pressure-sensitive adhesive.

* * * * *